May 27, 1952  J. P. ETHRIDGE  2,598,117
SAW GAUGE AND GUIDE
Filed June 14, 1948
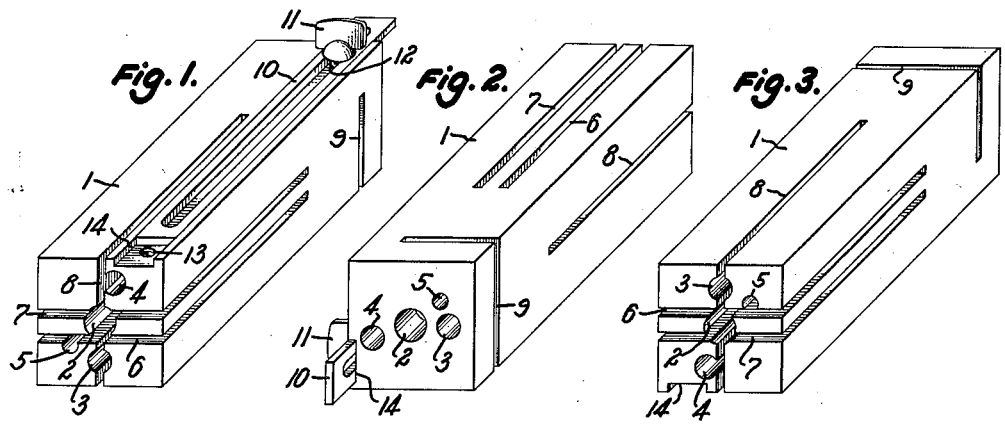
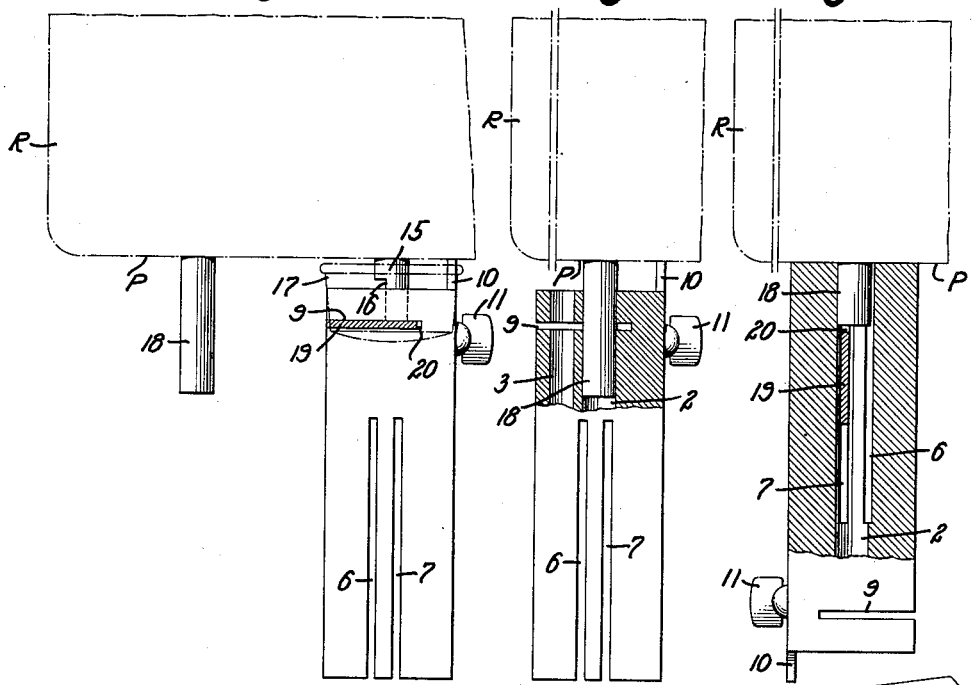
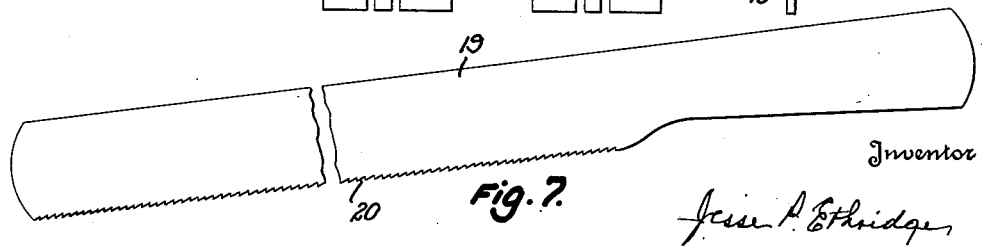
Inventor
Jesse P. Ethridge
By W. H. Finckel Jr.
Atty.

Patented May 27, 1952

2,598,117

UNITED STATES PATENT OFFICE 2,598,117

SAW GAUGE AND GUIDE

Jesse P. Ethridge, Louisville, Ga.

Application June 14, 1948, Serial No. 32,933

10 Claims. (Cl. 29—67)

This invention relates to a means for gauging and guiding a cutting tool, such as a saw, during the operation of forming saw cuts in selected workpieces, and it has special reference to such a gauge and guide adapted particularly to the needs of those working in the assembling, repair and replacement of various elements of radio sets, such as volume control and condenser units thereof which have control shafts provided with operating knobs or buttons all of which latter should, preferably, extend a uniform distance from the front or face panel of the particular radio set.

As is well known to those skilled in the art of the installation and replacement of units in radio sets, such units are furnished with control shafts of a length in excess of that required for the majority of radio sets of standard design, so that they may be installed in various makes of radio sets, the control shafts, upon installation, being cut to such a length and so prepared to receive the control knobs or buttons as to provide for the uniform arrangement of such knobs or buttons with respect to the others of the particular set.

In accordance with the installation practice made possible by use of the gauge and guide of the present invention, it is feasible to install the replacement units in the radio sets in their proper arrangement with respect to other units therein and prior to the cutting off (where necessary) of their control shafts and the preparation of the ends of such shafts to receive the control knobs or buttons, thereby insuring the desired uniform arrangement of all of the control knobs or buttons of a particular radio set with respect to the front or face panel thereof, all as will be explained hereinafter more fully and finally claimed.

In the accompanying drawing illustrating the invention, in the several figures of which like parts are similarly designated, Fig. 1 is a perspective view of the gauge and guide of the invention viewed from the slotted end thereof, Fig. 2 is a view similar to Fig. 1 but viewed from the opposite end with the device turned through 90° upon its longitudinal axis, Fig. 3 is a view similar to Fig. 1 but with the device turned through 180° upon its longitudinal axis, Figs. 4, 5 and 6 are plan views, with parts in section and parts schematically shown, of a fragment of a radio set and the control shafts of units thereof, illustrating one manner of use of the device of the invention, and Fig. 7 is a side view of a saw suitable for use with the device of the invention, a mid-portion of the saw blade being broken away.

Having reference particularly to Figs. 1, 2 and 3, it will be seen that the saw gauge and guide of the invention may preferably take the form of an elongated metal block 1 (substantially a parallelopiped) having a central longitudinal bore 2 of a diameter (say ¼″) to receive a standard diameter of radio unit control shaft, two longitudinally extending bores 3 and 4 of a diameter (say $\frac{3}{16}$″) to receive another standard diameter of control shaft, and another longitudinally arranged bore 5 of a diameter (say ⅛″) to receive still another standard diameter of control shaft.

As is well known to those skilled in the radio assembly and repair art, some control knobs or buttons applied to the ends of the control shafts of radio units are of the type affixed to the shafts by set screws. A knob or button of this type requires that there be a slightly flattened surface or portion adjacent to the end of the control shaft to which it is applied to form a proper bearing for the end of the set screw to prevent turning of the knob or button with respect to the shaft. Other control knobs or buttons are of the type having spring retaining means rather than set screws, and a knob of this type requires that its shaft have a greater lateral expanse of flattened portion than does the set-screw retained type of knob.

Inasmuch as shafts of the diameters (say ¼″ and $\frac{3}{16}$″) respectively to which the bores 2, 3 and 4 are adapted may require that either of the types of knobs above referred to be applied to them, the device of the invention is so designed as to guide a saw to cut either type of flattened portion upon a particular shaft. The guide slots 6 and 7 are so arranged with respect to the bore 2 as to cut chords of smaller and greater extent upon the circumference of the bore 2. As an example, with the shaft to be sawed being of ¼″ diameter the chord of the slot 6 will produce a flattened portion on the shaft of plus or minus $\frac{9}{64}$″ width, whereas the chord of slot 7 will produce a flattened portion of plus or minus $\frac{15}{64}$″ width.

Still another type of knob or button used upon the shafts of radio units is known as the "split-knurl" type. This type of knob requires for its attachment a slit extending diametrically and axially of the shaft. The slot 8 is so arranged with respect to the bores 2 and 3 that it can be used in guiding the saw to thus slit the ends of shafts of the two diameters to which these bores are related.

In addition, the location of the axis of the bore 4 with relation to the slot 8 is such that this slot may also be used for sawing a flattened portion upon the end of a shaft of a diameter to cooperate with the bore 4. If such shaft is of ¾₆" diameter, the flattened portion will be of plus or minus ⅟₆₄" width.

The bore 5 has its axis so located with respect to the slot 6 that a shaft of proper diameter for the bore, say ⅛", may have its end provided with a flattened portion of plus or minus ³⁄₃₂" width, which is the only type of flattened portion required upon shafts of this small diameter.

The block or guide member 1 is also provided with a cut-off guide slot 9 extending through the major thickness of the block transversely thereof adjacent to the end of the block remote from the slots 6, 7 and 8, and intersecting all of the bores 2, 3, 4 and 5. The block is provided at one of its outer faces, and longitudinally thereof, with a gauge member 10 adapted to be secured in any desired position of adjustment with respect to the block ends by a thumb screw 11 which may be threaded into either of the two tapped holes 12 and 13 located adjacent to the ends of the rabbet or channel 14 in which the gauge member is slidably guided.

Having reference to Figs. 4, 5 and 6 wherein a practical application of the device of the invention is shown in its use on a shaft of a diameter related to the bore 2, it will be assumed that the radio set R has a shaft 15 extending outwardly from the front or face panel P, such shaft having its end provided with a flattened portion 16 for the reception of a knob 17 of the spring retained type hereinbefore referred to, and that this shaft 15 and knob 17 are standard in size and arrangement for at least two of the controllable units of the set R. We will assume, also, that the shaft 18 extends outwardly from a replacement unit which has been installed in the set but the shaft 18 of which is of a length, as shown, inappropriate to that desired uniform arrangement of the control knobs or buttons of the set as indicated by the knob 17.

Obviously, before a control knob can be applied to the shaft 18 in such relation to the front panel P that it will be in alignment with the knobs of other control shafts, the shaft 18 must be cut off to the same length as the other shafts, and must be provided with the required flattened portion such as shown on the adjacent standard shaft 15.

In the use of the device of the invention for cutting off the shaft 18 and providing a flattened portion adjacent to its end, the knob 17 is first removed from the end of the standard shaft 15, and then, with the saw blade 19 resting in the transverse slot 9 of the block 1, the appropriately sized bore 2 of the block is slipped over the shaft 15 until the end of the shaft abuts against the saw blade, whereafter, with the parts thus retained, the gauge member 10 is adjusted into contact with the front panel P of the set and fixed in such adjustment by the thumb screw 11 (see Fig. 4).

Then, as shown in Fig. 5, the block 1 is removed from the standard shaft 15, the saw blade 19 is withdrawn, and the appropriate bore 2 of the block is slipped over the end of replacement shaft 18 until the gauge member 10 abuts against the front panel P of the set. Thereafter, with the block held in this position, the saw 19, guided by the transverse slot 9, is used to saw off the end of the shaft 18 to a length gauged as equal (with respect to the front panel P) to the length of the standard shaft 15.

In order now to produce the flattened portion adjacent to the end of the replacement shaft 18 substantially similar to that upon the standard shaft 15, the block 1 is reversed for end, the saw blade is passed into the appropriate longitudinal slot 7 with its teeth 20 facing the open end of the slot, the bore 2 is slipped upon the end of the shaft 18, as shown in Fig. 6, and the sawing of the flattened portion to the extent desired accomplished with the parts thus arranged, as will readily be understood.

Obviously, for different diameters of shafts for which the gauge and guide block is designed, others of its bores 3, 4 and 5 will be employed in the gauging and sawing operations.

It will be noted, moreover, that by proper use of the slots 7 and 8 with respect to the ends of two sections of shaft or rod material, a tongue and slot connection may be formed between such ends. The spacing of the near wall of the slot 7 from the axial center of the bore 2 is preferably substantially equal to one-half the thickness of the saw blade 19. Hence, if the end of one shaft section inserted in the bore 2 is sawed with the saw blade in the slot 7 and the shaft is then rotated through 180° and similarly again sawed, a tongue substantially equal in thickness to the thickness of the saw blade will be made to project from the end of this shaft section. Then, by inserting the other shaft section in the bore 2 and sawing its end in line with the slot 8, and hence diametrically, a slot will be formed in this section of a width substantially equal to that of the saw blade and proper mating engagement with the tongue formed upon the end of the first shaft section.

Where the standard shafts of the radio set have considerable extension beyond the front panel (more than illustrated in Figs. 4 to 6) the gauge member 10 may be used from the opposite end of the block 1 by engaging the thumb screw 11 with the other tapped opening 13 instead of the hole 12 to which the foregoing description relates. Also, when the outwardly extending end of the shaft to be flattened is of a length to extend sufficiently far beyond the inner ends of the slots 6, 7 and 8 longitudinally of the block to provide an adequate axial extent of the flattened portion, the sawing operation to produce this portion may be performed with the block arranged in the endwise position shown in Figs. 4 and 5, in which case the closed end of the slot used will determine the axial extent of the flattened portion, this extent being capable of limitation, moreover, by appropriate setting of the gauge member 10.

It will be appreciated that the size of the block itself and the diameters of the bores provided in it may be varied to suit conditions of use, and several blocks may, if desired, be provided to form a set of appreciable range. Also, the longitudinal extent of the slots 6, 7 and 8 may be varied to suit various purposes of use, it being obvious that if they are extended sufficiently near to the closed end of the block (appropriate mechanical strength of the block being taken into consideration, of course) they might be used for gauging the extent of sawing of the flattened portions upon relatively short extensions of shaft ends.

As shown in Figs. 4, 6 and 7, an appropriate saw for use with the device of the invention will have its blade of a thickness to provide an easy sliding fit in the slots 6, 7, 8 and 9 of the block 1, and its teeth will be about eighteen to the inch and without set, thus insuring a clean cut and guarding against binding or jamming of the saw in the slots.

It will thus be seen that the device of the invention combines in a single member means whereby the two operations ordinarily performed upon the ends of control shafts of radio units, and especially replacement units, namely sawing operations to make the shafts of predetermined length and to properly fashion the shafts to receive the control knobs or buttons, may be accomplished simply, expeditiously and accurately by providing for locating and guiding a saw, or equivalent cutting tool, during its cutting operations.

Various changes and modifications are considered to be within the principle of the invention and the scope of the following claims.

What I claim is:

1. A gauge and guide, comprising a guide member having a bore to axially receive and the wall of which will embrace a workpiece to restrain the same against movement transversely of the bore, said guide member provided also with a slot in substantial alignment with and intersecting said bore and terminating at one end within said guide member, the walls of said slot at opposite sides of said bore serving to guide a cutting tool to cut longitudinally of said workpiece within said bore.

2. A gauge and guide, comprising a guide member having a bore to axially receive and the wall of which will embrace a workpiece to restrain same against movement transversely of the bore, said member provided with a slot arranged transversely of and intersecting said bore and furnishing a means for guiding a cutting tool in the operation of producing a cut transversely of the workpiece, and said member provided also with a slot in substantial alignment with and intersecting said bore and terminating at one end within said guide member, the walls of said slot at opposite sides of said bore serving to guide a cutting tool in the operation of producing a cut longitudinally of said workpiece within said bore.

3. A gauge and guide, comprising a guide member having a bore to axially receive and the wall of which will embrace a workpiece, said member provided with a slot arranged transversely of and intersecting said bore and furnishing a means for guiding a cutting tool in the operation of producing a cut transversely of the workpiece, a gauge member adjustably mounted upon said guide member and serving when adjusted to locate said transverse slot with respect to said workpiece and a relatively fixed part, and said member provided also with a slot in substantial alignment with and intersecting said bore and terminating at one end within said guide member, the walls of said slot at opposite sides of said bore serving to guide a cutting tool in the operation of producing a cut longitudinally of said workpiece within said bore.

4. A gauge and guide for a cutting tool for shaping the end-adjacent portions of shafts, comprising a guide member provided with a longitudinally extending bore adapted to axially receive and the wall of which will embrace a shaft end to restrain the same against movement transversely of the bore, said guide member provided also with a plurality of slots arranged longitudinally of said bore and transversely intersecting said bore and terminating at one end within said guide member, the walls of said slots at opposite sides of said bore providing means for guiding a cutting tool longitudinally of the end portion of said shaft to shape the same in manners equal in number to the number of said slots.

5. A gauge and guide for a cutting tool for shaping the end-adjacent portions of shafts, comprising a guide member provided with a longitudinally extending bore adapted to axially receive and the wall of which will embrace a shaft end to restrain the same against movement transversely of the bore, said guide member provided also with two slots arranged longitudinally of said bore and transversely intersecting said bore and terminating at one end within said member, one of said slots intersecting said bore upon a chord of the circumference thereof and the other slot intersecting said bore diametrically thereof, the walls of said slots at opposite sides of said bore optionally providing, respectively, for guiding a cutting tool longitudinally of the bore to provide a flattened portion upon the shaft adjacent to the end thereof and for slitting the end-adjacent portion of said shaft.

6. A gauge and guide for a cutting tool for shaping the end-adjacent portions of shafts, comprising a guide member provided with a longitudinally extending bore adapted to axially receive and the wall of which will embrace a shaft end, and provided also with three slots arranged longitudinally of said bore and transversely intersecting said bore and terminating at one end within said member, two of said slots intersecting said bore upon chords of the circumference thereof of two different predetermined lengths and the third said slot intersecting said bore diametrically thereof, the walls of said slots at opposite sides of said bore optionally providing, respectively, for guiding a cutting tool longitudinally of the bore to provide a flattened portion upon the shaft adjacent to the end thereof of one of two extents of chord and for slitting the end-adjacent portion of said shaft.

7. A gauge and guide for a cutting tool for shaping the end-adjacent portions of shafts, comprising a guide member provided with a plurality of laterally spaced longitudinally extending bores of diameters respectively adapted to axially receive and the walls of which will respectively embrace the ends of shafts of various selected diameters, and provided also with a plurality of slots arranged longitudinally of said bores and terminating at one end within said member, certain of said slots intersecting certain of said bores upon chords of the circumferences thereof, the walls of said slots at opposite sides of said bores providing means for guiding a cutting tool selectively to provide flattened portions upon shafts of said various selected diameters adjacent to the ends thereof.

8. A gauge and guide for a cutting tool for shaping the end-adjacent portions of shafts, comprising a guide member provided with three longitudinally extending laterally spaced bores to axially receive and laterally embrace shafts of selected diameters, two of said bores being of a first selected diameter and the other bore being of a second selected diameter, said guide member being provided also with a transverse slot extending longitudinally of said bores and terminating at one end within said member, said slot intersecting a bore of each of said selected diameters diametrically thereof and intersecting the other of said bores upon a chord of the circumference thereof, the walls of said slot at opposite sides of said bores serving optionally to guide a cutting tool to slit or produce a flattened portion endwise of a shaft of the first selected diameter or to slit endwise a shaft of the second selected diameter.

9. A gauge and guide for a cutting tool for shaping the end-adjacent portions of shafts, comprising a guide member provided with three longitudinally extending laterally spaced bores to axially receive and laterally embrace shafts of selected diameters, two of said bores being of a first selected diameter and the other bore being of a second selected diameter, said guide member being provided also with two transverse slots extending longitudinally of said bores and terminating at one end within said member, one of said slots intersecting one bore of the first selected diameter and the bore of the second selected diameter diametrically thereof and intersecting the other bore of the first selected diameter upon a chord of the circumference thereof, and the other slot intersecting the bore of the second selected diameter upon a chord of the circumference thereof, the walls of said slots at opposite sides of said bores serving optionally to guide a cutting tool for diametrically slitting the end of a shaft of either selected diameter or for producing a flattened portion adjacent to the end of a shaft of either selected diameter.

10. A gauge and guide for a cutting tool for cutting shafts to predetermined length and for shaping the end-adjacent portions thereof, comprising a guide member provided with a plurality of longitudinally extending bores of diameters to axially receive and the walls of which will laterally embrace shafts of substantially corresponding diameters, slot means arranged longitudinally of said guide member and terminating at one end within said member, said slot means extending transversely said member and intersecting said bores and their walls at opposite sides of said bores serving to guide a cutting tool in the operation of cutting endwise longitudinally of selected shafts, and said guide member provided also with a transverse guide slot intersecting all of said bores and its walls serving as guide means for a cutting tool in the operation of transversely cutting said selected shafts.

JESSE P. ETHRIDGE.

REFERENCES CITED

The following references are of record in the file of this patent:

UNITED STATES PATENTS

| Number | Name | Date |
| --- | --- | --- |
| 477,638 | Brewer | June 28, 1892 |
| 1,109,952 | Armstrong | Sept. 8, 1914 |
| 1,736,709 | Flagg | Nov. 19, 1929 |
| 2,107,635 | Junkermann | Feb. 8, 1938 |
| 2,420,469 | Doniger | May 13, 1947 |